(12) United States Patent
Kaneko

(10) Patent No.: US 8,719,477 B2
(45) Date of Patent: May 6, 2014

(54) COMMUNICATION SYSTEM, MASTER NODE, AND SLAVE NODE

(75) Inventor: Naoji Kaneko, Toyokawa (JP)

(73) Assignee: Denso Corporation, Kariya (JP)

( * ) Notice: Subject to any disclaimer, the term of this patent is extended or adjusted under 35 U.S.C. 154(b) by 381 days.

(21) Appl. No.: 13/299,513

(22) Filed: Nov. 18, 2011

(65) Prior Publication Data

US 2012/0137034 A1  May 31, 2012

(30) Foreign Application Priority Data

Nov. 19, 2010  (JP) ................................. 2010-259077

(51) Int. Cl.
*G06F 13/36* (2006.01)
(52) U.S. Cl.
CPC ...................................... *G06F 13/36* (2013.01)
USPC .......................................... 710/117; 710/110
(58) Field of Classification Search
CPC ...................................................... G06F 13/36
USPC ......... 710/14, 18, 45, 46, 105, 109, 110, 124, 710/305, 117
See application file for complete search history.

(56) References Cited

U.S. PATENT DOCUMENTS

| | | | |
|---|---|---|---|
| 7,269,675 B2 * | 9/2007 | Dalakuras et al. ............ | 710/107 |
| 7,913,012 B2 * | 3/2011 | Piasecki et al. ................ | 710/110 |
| 2003/0070019 A1 * | 4/2003 | Dalakuras et al. ............ | 710/110 |
| 2005/0265344 A1 * | 12/2005 | Harris et al. .................... | 370/392 |
| 2010/0220735 A1 * | 9/2010 | Vermunt et al. ............... | 370/401 |
| 2012/0084378 A1 * | 4/2012 | Kaneko et al. ................. | 709/208 |
| 2012/0117287 A1 * | 5/2012 | Kashima ........................ | 710/110 |

FOREIGN PATENT DOCUMENTS

| | | |
|---|---|---|
| JP | 06-164603 | 6/1994 |
| JP | 2007-066111 | 3/2007 |

OTHER PUBLICATIONS

U.S. Appl. No. 13/200,738, filed Sep. 29, 2011, Kaneko et al.
U.S. Appl. No. 13/291,415, filed Nov. 8, 2011, Kashima.
M. Sato, "Detailed Description of Vehicle Network System", pp. 70-77, Dec. 1, 2005, with partial English translation.
Office Action issued Aug. 7, 2012 in corresponding Japanese Application No. 2010-224214 relating to co-pending U.S. Appl. No. 13/200,738, with English translation.

* cited by examiner

*Primary Examiner* — Khanh Dang
(74) *Attorney, Agent, or Firm* — Harness, Dickey & Pierce, PLC

(57) ABSTRACT

In a node communicably coupled to alternative nodes through a bus, a transmitting unit receives first designation information from an alternative node. When the first designation information designates the node, the transmitting unit successively transmits, on the bus, the first designation information and data. When a request of an active communication occurs in the node, a request unit determines whether to receive a former part of the first identification information indicative of start timing of an active communication mode on the bus. When determining to receive the former part of the first identification information, the request unit transmits, on the bus, collision information at a timing that allows the collision information to collide with a latter part of the first identification information, resulting in rewrite of the first identification information based on bus arbitration, and transmits second designation information meeting the request of the active communication.

5 Claims, 12 Drawing Sheets

FIG.2
(a)
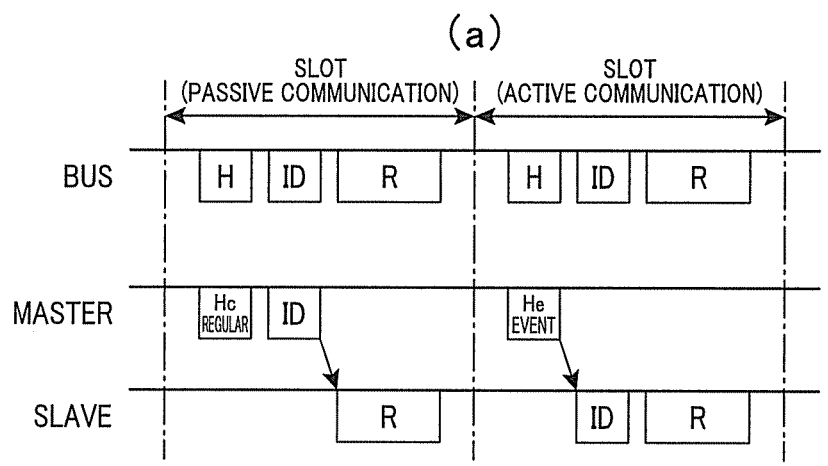
(b)
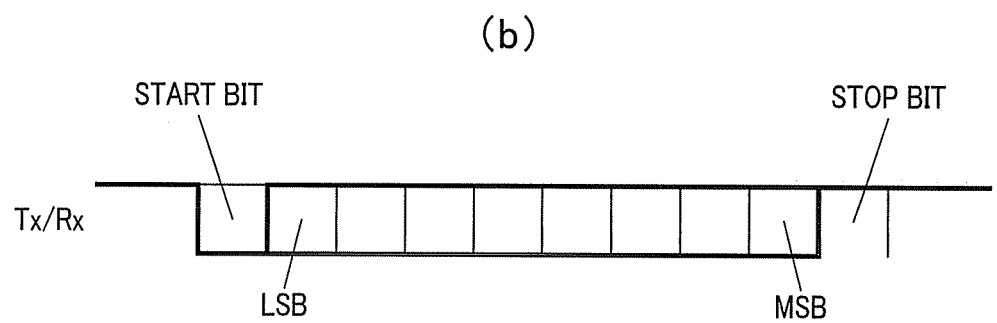
(c)
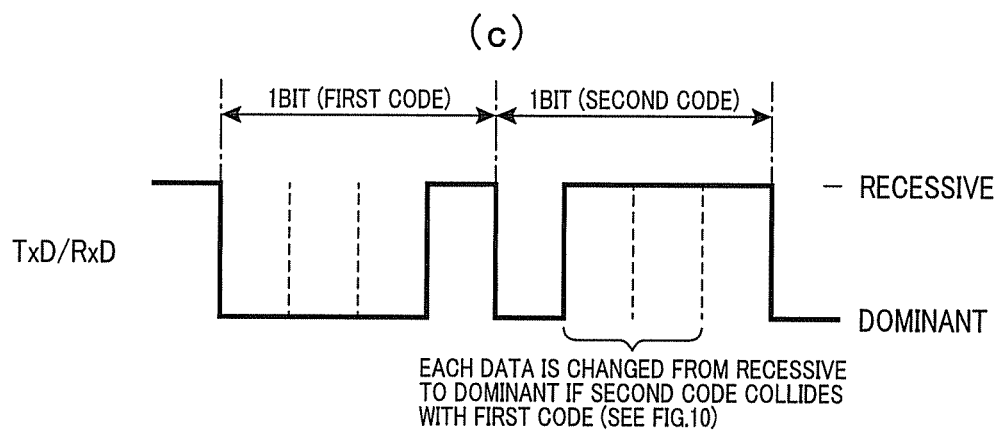

US 8,719,477 B2

COMMUNICATION SYSTEM, MASTER NODE, AND SLAVE NODE

CROSS REFERENCE TO RELATED APPLICATIONS

This application is based on Japanese Patent Application 2010-259077 filed on Nov. 19, 2010. This application claims the benefit of priority from the Japanese Patent Application, so that the descriptions of which are all incorporated herein by reference.

TECHNICAL FIELD

The present disclosure relate to communication systems combine a passive communication mode and an active communication mode. In the passive communication mode, a slave node designated by a master node sends data, and in the active communication mode, slave nodes actively send data.

BACKGROUND

There are well-known master-slave communication protocols. In accordance with a master-slave communication protocol as a typical example of the master-slave communication protocols, a master node transmits a header with an ID, and a slave node, which is associated with the ID of the header, transmits data as a response to a network; the set of the header and corresponding response is communicated through the network as a frame. A master node will be referred to simply as a master, and a slave node will be referred to simply as a slave.

In the master-slave communication protocol, a slave passively sends data when only receiving a corresponding one of headers sent from a master in accordance with a predetermined schedule. For the master-slave communication protocol, if an event occurs in a slave, there is a requirement to immediately inform another node of the event. In order to meet such a requirement, installation, in a master-slave communication protocol, of a mechanism has been proposed; the mechanism allows slaves to actively transmit data without waiting for data sending timings in accordance with schedules predetermined by masters.

For example, in LIN (Local Internet Network) protocol, as an example of these master-slave communication protocols, which is applied for in-vehicle networks, headers for event-triggered frames are prepared in addition to headers for unconditional frames. A header of an event-triggered frame causes a slave detecting the occurrence of an event to transmit, via a LIN bus, a response, and a header of an unconditional frame causes a slave identified by the header to transmit, via the LIN bus, a response.

Specifically, in the LIN protocol, when detecting the occurrence of an event, a slave is triggered to send a response using an event triggered frame (see "DETAILED DESCRIPTION OF VEHICLE NETWORK SYSTEM", MICHIO SATO, published on Dec. 1, 2005, CQ PUBLISHING CO., LTD).

In addition, the following communication method is disclosed in Japanese Patent Application Publication NO. 2007-066111. In the communication method, pieces of output data from a master are collectively transferred via a bus to slaves in a single OUT frame, and pieces of input data from the slaves are replied in their IN frames at their non-overlappedly allocated time slots to the master via the bus. This can implement regular communications between the master and the slaves.

Additionally, in the communication method, when the master identifies, in an OUT frame, one or more slaves that the master wants to check for whether there are messaging requirements therein, and the identified one or more slaves reply a response frame indicative of messaging requirements, the master transmits a messaging allowance frame to at least one slave that has replied the response, thus passing, to the at least one slave, authority to the bus. This results in that the at least one slave with the authority to the bus can transmit messages to the master. That is, the communication method disclosed in the Patent Publication allows each slave to actively transmit data to, for example, the master.

SUMMARY

In the LIN protocol, the header, referred to as an event header, of an event-triggered frame can be associated with slaves, which is different from the header of an unconditional frame; the header of an unconditional frame is associated with a single slave. For this reason, as illustrated in FIG. 15, if a slave _1 and a slave _2, both of which are associated with the event header "H" of the ID "10x10 (hex 10)" and they simultaneously send responses "R" when events occur in the slaves _1 and _2, there is a collision between these responses R. Note that, in FIG. 10, the ID of "10x10" is used as the common event header for the slaves _1 and _2, and IDs of "20x20" and "30x30" are used for uniquely identifying the respective slaves _1 and _2 for unconditional frames (for polling of the slaves _1 and _2). 1 SLOT (FLAME SLOT) represents time allocated for sending one frame (header and response) through the LIN bus.

If a collision between the responses R from the slaves _1 and _2 is detected in the corresponding slot (the first slot at the collision), the colliding responses R are discarded, and the master transmits, to one of the corresponding slaves _1 and _2, such as the slave _1, the header (ID of "20x20" identifying the slave _1 that should respond it in the following second slot, and transmits, to the other of the corresponding slaves _1 and _2, such as the slave _2, the header (ID of "30x30" identifying the slave _2 that should respond it in the following third slot.

However, the aforementioned method for addressing a collision between responses from slaves requires corresponding colliding slaves to successively send their responses. This may result in a reduction of communication efficiency in communications using the LIN protocol.

In addition, in order to allow a slave to actively send data to the master, the communication method disclosed in the Patent Publication NO. 2007-066111 requires:

the sending of an OUT frame from the master to a specified slave;

the sending of a response frame from the specified slave to the master; and the sending of a messaging allowance frame from the master to the specified slave.

In other words, the communication method disclosed in the Patent Publication NO. 2007-066111 allows a slave to actively send data to the master only when these three frames (OUT frame, response frame, and messaging allowance frame) have been communicated.

Thus, the communication method disclosed in the Patent Publication NO. 2007-066111 makes complicated the communication procedure to allow a slave to actively send data to the master. This may result in both: a reduction of communication efficiency in communications on the bus using the communication method, and a difficulty to immediately inform the master of the occurrence of an event.

In view of the circumstances set forth above, one aspect of the present disclosure seeks to provide communication systems each comprised of a master node and a plurality of slave nodes communicably coupled to the master node via a bus, which are designed to address at least one of the problems set forth above.

Specifically, an alternative aspect of the present disclosure aims to provide such communication systems capable of actively sending data from a slave node immediately with higher communication efficiency.

In addition, a further aspect of the present disclosure aims to provide a master node communicably coupled to a plurality of slave nodes via a bus; the master allows a slave to actively send data immediately with higher communication efficiency. A still further aspect of the present disclosure seeks to provide a slave node communicably coupled to a master node via a bus; the slave node is capable of actively sending data immediately with higher communication efficiency.

According to one aspect of the present disclosure, there is provided a communication system including: a bus and a plurality of nodes including a master node and a plurality of slave nodes. The plurality of nodes are communicably coupled to each other through the bus. The master node is configured to transmit, in a passive communication mode, at least one of: first identification information and second identification information on the bus, the first identification information representing start timing of the passive communication mode, the second identification information including at least first designation of one of the plurality of nodes allowed to transmit data. The master node is configured to transmit, in an active communication mode, third identification information indicative of start timing of the active communication mode on the bus. When a request of an active communication occurs in at least one of the plurality of nodes, the at least one of the plurality of nodes serves as a request node in the active communication mode to receive, from the bus, the third identification information and successively transmit, on the bus, the third identification information and a second designation of at least one of the plurality of nodes allowed to transmit data. Each of the plurality of nodes is configured to, when receiving any one of the first designation and the second designation as designation information that designates the corresponding node, transmit, on the bus, the designation information, and, subsequent to the designation information, data. The first identification information and the third identification information are designed to be identifiable from each other based on a former part of the first identification information and a former part of the third identification information. The request node is configured to, when determining to receive the former part of the first identification information, transmit, on the bus, collision information at a timing that allows the collision information to collide with a latter part of the first identification information, resulting in rewrite of the first identification information based on arbitration on the bus between, the collision information and the latter part of the first identification information. The request node is configured to regard the rewritten first identification information as the third identification information, and to operate in the active communication mode.

The communication system according to the one aspect of the present disclosure allows each node to determine whether there is timing for starting the passive communication mode or timing for starting the active communication mode based on the first identification information or the second identification information transmitted from the master node. This configuration eliminates the need of communications between the nodes using specific frames for switching between the passive communication mode and the active communication mode. Thus, if there is a need for a node to actively transmit data, the node can immediately perform communications in the active communication mode.

Particularly, the communication system according to the one aspect of the present disclosure is configured to, when a request of the active communication occurs at a timing of the passive communication, transmit the collision information to rewrite the first identification information to the third identification information, thus performing communications in the active communication mode. This performs communications in the active communication mode higher in priority than communications in the passive communication mode.

In addition, the communication system according to the one aspect of the present disclosure is configured such that, if there are requests of active communications in some nodes, that is, these nodes transmit the third identification information in the active communication mode, arbitration on the bus among pieces of the third identification information transmitted from these nodes allows only one of the pieces of third identification information, which wins the arbitration on the bus, to be transmitted on the bus. This results in that communications in the active communication mode are performed. Thus, it is possible to efficiently transmit data from each node without increasing traffic on the bus.

Note that, as each of the first designation and the second destination, information/data to identify at least one node, or information/data to identify type of data to indirectly designate at least one node as a sender node of the type of data can be used.

In an exemplary embodiment of the one aspect of the present disclosure, the master node is configured to transmit, in the passive communication mode, the second identification information including a set of the start timing of the passive communication and the first designation of the one of the plurality of nodes. This exemplary embodiment eliminates separate transmission of the first designation of the one of the plurality of nodes from identification information, thus reducing the length of a message in the passive communication mode. This makes it possible to more improve communication efficiency on the bus.

According to another aspect of the present disclosure, there is provided a node communicably coupled to a plurality of alternative nodes through a bus. The node includes a transmitting unit configured to receive first designation information from one of the plurality of alter nodes and, when the first designation information designates the node, transmit, on the bus, the first designation information and, subsequent to the first designation information, data. The node includes an active communication request unit configured to, when a request of an active communication occurs in the node, determine whether to receive a former part of the first identification information indicative of start timing of an active communication mode on the bus. When determining to receive the former part of the first identification information, the active communication request unit is configured to transmit, on the bus, collision information at a timing that allows the collision information to collide with a latter part of the first identification information, resulting in rewrite of the first identification information based on arbitration on the bus between the collision information and the latter part of the first identification information. The active communication request unit is configured to transmit, subsequent to the rewritten first identification information, second designation information meeting the request of the active communication.

In the communication system according to the alternative aspect of the present disclosure, a node, in which a request of an active communication occurs, transmits, on the bus, collision information to rewrite the first identification information, thus transmitting any one of the rewritten identification information and the collision information on the bus as second identification information indicative of start timing of the active communication mode. This improves communications in the active communication mode higher in priority than communications in the passive communication mode and immediately from the occurrence of the request of an active communication.

According to a further aspect of the present disclosure, there is provided a node communicably coupled to a plurality of alternative nodes through a bus. The node includes a transmitting unit configured to receive first designation information from one of the plurality of alternative nodes and, when the first designation information designates the node, transmit, on the bus, the first designation information and, subsequent to the first designation information, data. The node includes an active communication request unit configured to, when a request of an active communication occurs in the node, determine whether to receive a former part of the first identification information indicative of start timing of an active communication mode on the bus. When determining to receive the former part of the first identification information, the active communication request unit is configured to transmit, on the bus, collision information at a timing that allows the collision information to collide with a latter part of the first identification information, resulting in rewrite of the first identification information based on arbitration on the bus between the collision information and the latter part of the first identification information. The active communication request unit is configured to transmit, subsequent to the rewritten first identification information, second designation information meeting the request of the active communication.

The configuration of the node according to the further aspect of the present disclosure allows the node to be suitably applied to each of the plurality of nodes according to the one aspect of the present disclosure.

According to a still further aspect of the present disclosure, there is provided a node communicably coupled to a plurality of alternative nodes through a bus. The node includes a transmitting unit configured to receive first designation information from one of the plurality of alternative nodes and, when the first designation information designates the node, transmit, on the bus, the first designation information and, subsequent to the first designation information, data. The node includes an active communication request unit configured to, when a request of an active communication occurs in the node, transmit, on the bus, collision information during a period within which no data and designation information are communicated on the bus. The collision information is configured to rewrite the first identification information when colliding with the first identification information. Any one of the rewritten identification information and the collision information is configured to be transmitted on the bus as second identification information indicative of start timing of an active communication mode. The active communication request unit is configured to transmit, subsequent to the second identification information, second designation information meeting the request of the active communication.

The configuration of the node according to the still further aspect of the present disclosure allows the node to be suitably applied to each of the plurality of nodes according to the alternative aspect of the present disclosure.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which:

FIG. 2 is a view schematically illustrating the structure of a frame to be used in the communication system, the structure of data to be communicated between a microcomputer and a transceiver of the communication system, and the structure of encoded data according to the first embodiment;

DETAILED DESCRIPTION OF EMBODIMENT

Figure 1:
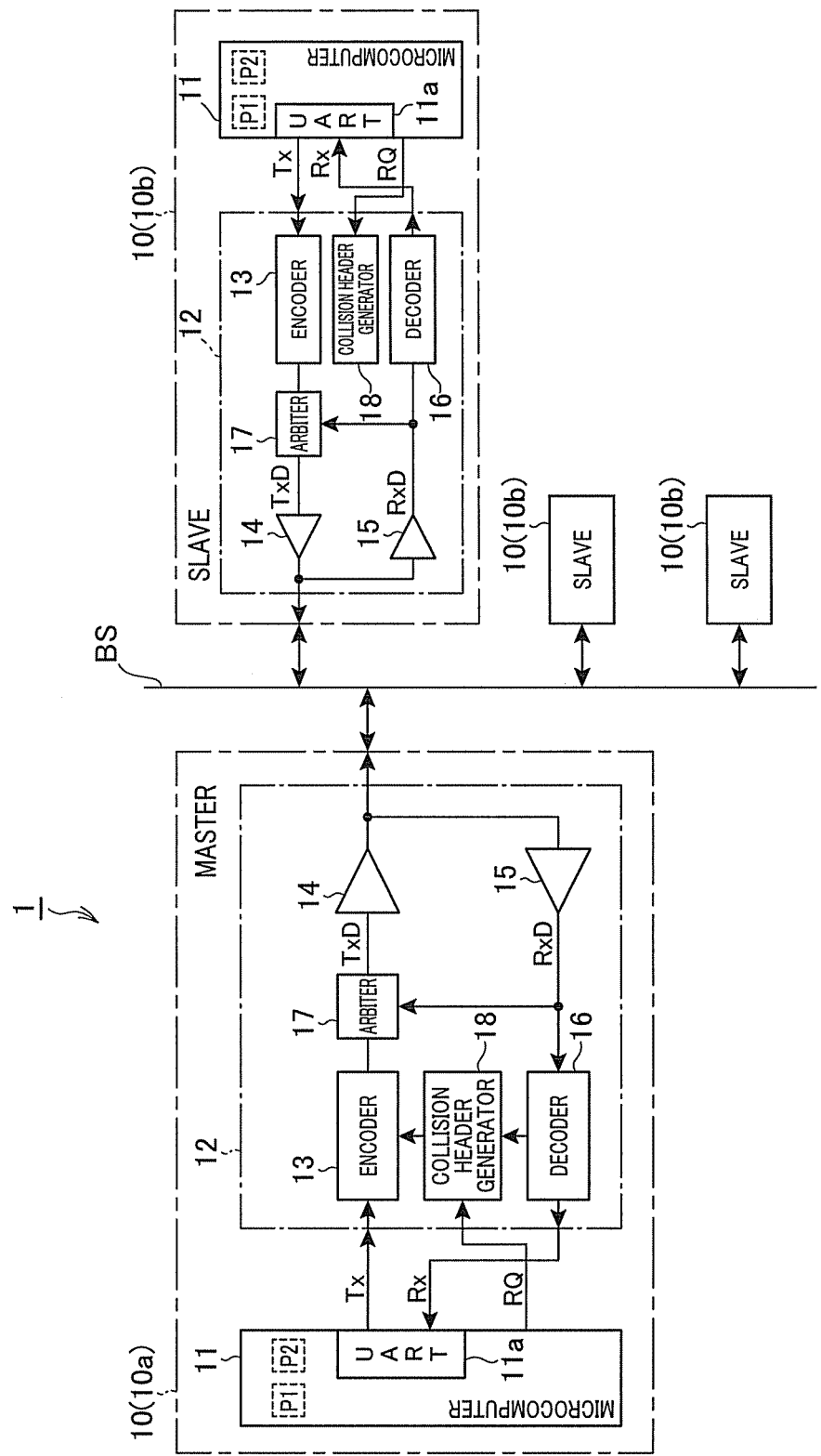
FIG. 1 is a circuit diagram schematically illustrating an example of the overall structure of a communication system according to a first embodiment of the present disclosure.

Embodiments of the present disclosure will be described hereinafter with reference to the accompanying drawings. In the embodiments, like parts between the embodiments, to which like reference characters are assigned, are omitted or simplified in redundant description.

First Embodiment

An example of the overall structure of a communication system 1 for vehicles is illustrated in FIG. 1; to the communication system 1, a preselected master-slave communication protocol, such as LIN protocol, is applied.

The communication system 1 includes a master node 10*a*, a plurality of slave nodes 10*b* to be controlled by the master node 10*a*, and a bus BS through which the master node 10*a* is communicably coupled to the slave nodes 10*b*. Note that a node is, for example, a hardware computing terminal or a software module.

For example, in the first embodiment, the slave nodes 10*b* are installed in plural types of target devices; these plural types of target devices are provided in a target vehicle for detecting the operating conditions of the target vehicle, controlling them and/or actuating corresponding parts of the target vehicle.

The master node 10*a* is operative to communicate with the slave nodes 10*b* via the bus BS to thereby obtain the operating conditions of the target vehicle, and/or instruct the slaves 10*b* to control and/or actuate the corresponding target devices for control of the target vehicle. The master node 10*a* will be referred to simply as the master 10*a*, and the slave nodes 10*b* will be referred to simply as the slaves 10*b*. These master 10*a* and slaves 10*b* will be collectively referred to as nodes 10.

In this embodiment, the master 10*a* consists of an electronic control unit ECU communicably coupled to an in-vehicle network to which a CAN (Controller Area Network) protocol is applied. The master 10*a* according to this embodiment is operative to carry out automotive-body applications of the target vehicle. For example, if the master 10*a* is an ECU for controlling door applications of the target vehicle, control/actuate devices for automotive-body parts, such as mirrors, door locks, windows, and so on can be used as the target devices installed with the slaves 10*b*.

Note that a plurality of masters 10*a* can be provided in the target vehicle; each of these masters 10*a* can control a corresponding plurality of slaves 3. As the target devices installed with the slaves 10*b*, control/actuate devices for other automobile parts, such as sunroofs, wipers, air conditioners, steering, lights, and so on can be used.

The master 10*a* and the slaves 10*b* according to this embodiment operate in accordance with the preselected master-slave protocol. In the master-slave protocol, the master 10*a* is designed to communicate with the slaves 10*b* using frames each of which is a unit of data to be transmitted and received via the bus BS.

(a) of FIG. 2 schematically illustrates the structure of a frame according to this embodiment.

In the preselected master-slave protocol, the master 10*a* operates in a passive communication mode to successively designate the slaves 3, in other words, performs polling of the slaves 3, and each designated slave 3 operates in the passive communication mode to send a response (data). The passive communication mode will be referred to as a "regular communication mode". On the other hand, each slave 3 operates in a active communication mode to actively send data during a period specified by the master 10*a*. The active communication mode will be referred to as an "event communication mode".

As illustrated in (a) of FIG. 2, in the regular communication mode, the master 10*a* successively sends a header (Hc) indicative of execution timing of regular communications, and a designation ID designating a slave 10*b* requested by the master 10*a* to reply a response R. The header and designation ID are successively received by the slaves 10*b* via the bus BS. A node 10, whose ID is not matched with the received designation ID, outputs the received header and designation ID (or a received frame described later) without sending any response. Otherwise, a node 10 whose ID is matched with the received designation ID sends the received designation ID, and sends a response R after the received designation ID. As a result, data is sent through the bus BS as a frame (message frame) containing the set of the header, the designation ID, and the response. One slot is allocated for one frame on the bus BS and required for passing the one frame.

On the other hand, in the event communication mode, as illustrated in (a) of FIG. 2, the master 10*a* sends only a header (He) indicative of execution timing of event communications. The header He is received by the nodes 10 via the bus BS. If a node 10, in which a request of event communications has occurred, successively sends the received header He and a designation ID required for the request. If a node 10 is designated by the designation ID, successively sends the received designation ID and a response R following the received designation ID.

The event communication mode is used in cases where it is necessary for a slave 10*b* to immediately inform the master 10*a* that the state of a corresponding target device is changed due to the driver's operation, such as open or close of a corresponding door as the occurrence of an event (an event trigger).

Note that a designation ID is information directly designating a corresponding node 10, or designating a type of data to be transmitted as a response R, thus indirectly designating a node 10 as a sender of the type of data.

Next, an example of the overall structure of each node 10, in other words, each of the master 10*a* and a slave 10*b* will be described.

Referring to FIG. 1, each node 10 is comprised of a microcomputer 11 and a transceiver 12. The microcomputer 11 is communicable with the transceiver 12, and operative to carry out tasks to communicate with slaves 3 and other ECUs. The transceiver 12 is connected with the bus BS, and operative to: encode data Tx provided from the microcomputer 11 into transmit data TxD; output the transmit data TxD to the bus BS; receive data (received data) RxD on the bus BS; decode the received data RxD into data Rx; and input the decoded data Rx to the microcomputer 11.

The microcomputer 11 is comprised of a UART (Universal Asynchronous Receiver Transmitter) 11*a* in addition to a common main module including a CPU, a ROM, a RAM, an IO port, and one ore more peripherals; this UART 11*a* is operative to carry out serial start-stop communications (serial asynchronous communications). The UART 11*a* can be designed as a hardware circuit or a software module.

The UART 11*a* uses NRZ (Non-Return to Zero) code. Specifically, each of data Tx to be transmitted from the UART 11*a* and data Rx to be received thereinto consists of a logical low start bit with one-bit length, a configurable number of data bits (8 bits in this embodiment), and one ore more logical high stop bits (one stop bit in this embodiment). The start bit represents the start of the corresponding data Tx/Rx, and the stop bit represents the stop of the corresponding data Tx/Rx. That is, each of data Tx and data Rx according to this embodiment is designed as 10-bit block data. The first data bit of the 8-bit data as the main part of data Tx or Rx is the least significant bit (LSB), and the last data bit thereof is the most significant bit (MSB).

In this embodiment, each of headers H (Hc and He) and IDs is comprised of 10-bit block data transmittable or receivable by the UART 11*a* at a time, and each response is comprised of a predetermined number of, such as one or more, pieces of block data. For example, one byte data (8-bit data) of a regular header He is expressed as "0xFF" in hexadecimal (hex), and one byte data (8-bit data) of an event header He is expressed as "00x00" in hex. If the byte data "0xFF" of a regular header He is rewritten into the byte data "0xF0" in hex by a collision header described later, the rewritten regular header He will be referred to as a "rewritten event header Hx".

The microcomputer 11 of a node 10 is operative to run tasks to implement uniquely allocated functions, generate data to be transmitted as responses R during the tasks, and generate requests of event communications.

Particularly, the microcomputer 11 of a slave 10b is operative to run a corresponding slave task that executes the sending of a response R in accordance with received designation ID and/or event communications.

The microcomputer 11 of the master 10a is operative to run a master task that controls, in accordance with a previously established schedule, the sending of headers H to control communications on the bas BS, and nm a slave task identical to the slave task of each slave 10b in order to cause the master 10a to serve as a slave.

The transceiver 12 is comprised of an encoder 13, a transmit buffer 14, a receive buffer 15, a decoder 16, an arbiter 17, and a collision header generator 18.

The encoder 13 is operative to encode data Tx in NRZ code supplied from the microcomputer 11 into transmit data TxD in code used on the bus BS. The transmit buffer 14 is operative to transmit the transmit data TxD encoded by the encoder 13 to the bus BS, and the receive buffer 15 is operative to capture data in PWM code on the bus BS as received data RxD. The decoder 16 is operative to decode the received data RxD in PWM code into data Rx, and feed the decoded data Rx to the microcomputer 11.

In response to detecting the start bit of transmit data TxD or received data RxD, the arbiter 17 enables the supply of transmit data Txd to the transmit buffer 14 from the encoder 13 over only a period corresponding to the length of block data, that is, a period required to transmit data of 10 bits. In addition, the arbiter 17 disables the supply of transmit data TxD to the transmit buffer 14 from the encoder 13 immediately in response to detecting the transmit data TxD and received data RxD are mismatched in level with each other.

The collision header generator 18 is operative to extract a collision header from received data RxD in response to the input of a transmission request RQ from the microcomputer 11, and supply the collision header to the encoder 13 at predetermined timing based on the extracted timing of the collision header.

In this embodiment, the bus BS has two states (logical levels): dominant state (the logical low level) and recessive state (the logical high level). For example, the dominant (logical low level) corresponds to, for example, a ground level (logical 0), the recessive corresponds to, for example, a level (logical 1) of a battery (not shown), and, in the idle state of the bus BS in which no signals appear on the bus BS, the level on the bus BS is set to the recessive.

Specifically, the transmit buffer 14 is configured to set the level on the bus BS to the dominant (logical low level) if signals are simultaneously transmitted from the transmit buffers 14 of alternative nodes as long as at least one of the signals has the logical low level (dominant). The transmit buffer 14 is also configured to output the logical high level (recessive) if the supply of transmit data TxD is disabled by the arbiter 17. The structure of the bus BS and the transmit buffer 14 of each node can be implemented using, for example, a single wire, common open-collector circuits, and pull-up resistors.

The receive buffer 15 is designed as, for example, a common comparator, and operative to output the logical high level if the level on the bus BS is higher than a preset threshold level, and the logical low level if the level on the bus BS is lower than the preset level.

For example, as illustrated in (c) of FIG. 2, the encoder 13 is operative to:

divide the length of each bit of data Tx into quarters;

convert a corresponding bit of the data Tx into the first code if the corresponding bit is the logical low level L (0), the first code consists of the logical low levels in the former three-quarters of the corresponding bit, and the logical high level in the later quarter thereof; and convert the corresponding bit of the data Tx into the second code if the corresponding bit is the logical high level H (1), the second code consists of the logical low level in the former quarter of the corresponding bit, and the logical high levels in the later three-quarters thereof.

That is, the encoder 13 is operative to convert an NRZ code into a PWM code.

In contrast, the decoder 16 is operative to convert the first code of received data RxD into a bit of the logical low level, and convert the second code of the received data RxD into a bit of the logical high level.

That is, the decoder 16 is operative to convert a PWM code into an NRZ code.

Specifically, on the bus BS, when there is a collision between the first code in first transmit data TxD from a node and the second code in second transmit data TxD from an alternative node, the first code in the first transmit data TxD wins on bus arbitration whereas the second code loses thereon so that the first code is transmitted with the second code is rewritten into the first code. As a result of the collision, in the alternative node, the second code in the second transmit data TxD from the alter native node is mismatched with the first code in the received data RxD captured from the bus BS. Thus, in response to detecting the mismatching, the arbitrator 17 of the alternative node disables the supply of transmit data TxD to the transmit buffer 14.

The arbiter 17 is comprised of, for example, an XOR gate to which transmit data TxD and received data RxD are inputted, a gate for enabling or disabling the supply of transmit data TxD to the transmit buffer 14, and a measuring circuit for measuring time corresponding to 10 bits from the detection of the start bit of transmit data TxD or received data RxD.

Next, operations of the collision header generator 18 will be described hereinafter with reference to FIG. 3. For example, the collision header generator 18 can be easily constructed by a logical circuit.

Figure 3:
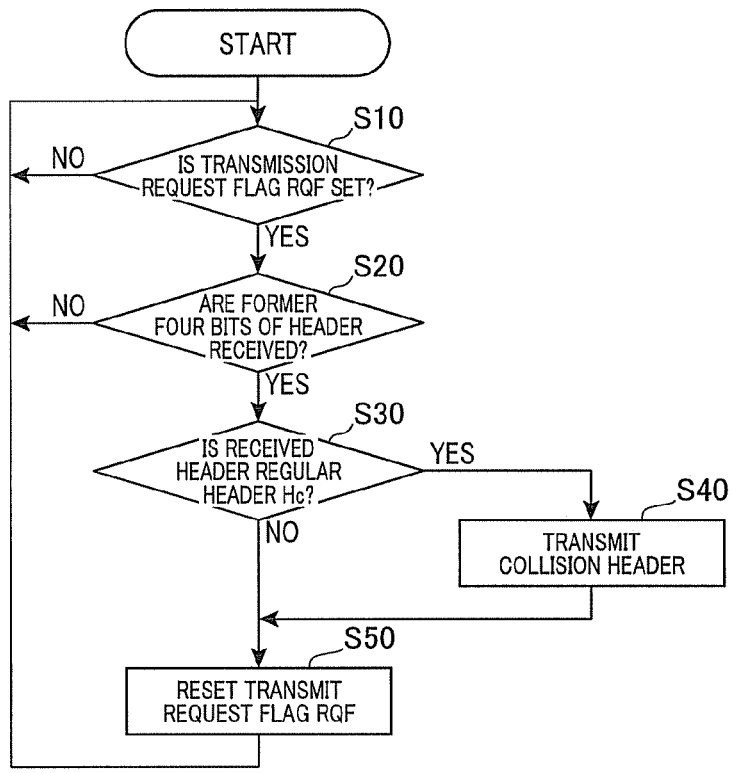
FIG. 3 is a flowchart schematically illustrating operations of a collision header generator illustrated in FIG. 1.

Referring to FIG. 3, when, for example, a corresponding node is activated, the collision header generator 18 determines whether a transmission request flag RQF is set in step S10.

If it is determined that the transmission request flag RQF is not set (NO in step S10), the collision header generator 18 repeats the determination in step S10 until the transmission request flag RQF is set.

Otherwise, if it is determined that the transmission request flag RQF is set in response to the input of the transmission request RQ from the microcomputer 11 (YES in step S10), the collision header generator 18 determines whether the first four bits of a header H (the first five bits including the start bit of a header H) are received by the decoder 16 in step S20. If it is determined that the first (twiner) four bits of a header H (the first five bits including the start bit of a header H) are not received by the decoder 16 (NO in step S20), the collision header generator 18 returns to step S10, and repeats the operations in steps S10 and S20.

Otherwise, if it is determined that the first (twiner) four bits of a header H (the first five bits including the start bit of a header H) are received by the decoder 16 (YES in step S20), the collision header generator 18 determines whether the received header H is a regular header He in step S30. Because the regular header He is expressed as "0xFF" in hex (11111111 in binary), if each of the received four bits is the second code "H (1)", the collision header generator 18 determines that the received header H is a regular header He (YES in step S30).

After the affirmative determination in step S30, the collision header generator 18 causes the encoder 13 to transmit a collision header consisting of four bits each being the first code "L (0)" such that the collision header is overlapped with the second (latter) four bits of the received header H in step S40. Thereafter, the collision header generator 18 resets the transmission request flag RQF in step S50, returning to step S10 and repeats the operations in step S10 to S50.

Otherwise, if it is determined that the received header H is not a regular header Hc, that is, an event header He (NO in step S30), the collision header generator 18 resets the transmission request flag RQF without transmitting any collision headers in step S50, returning to step S10 and repeating the operations in step S10 to S50.

Figure 4:
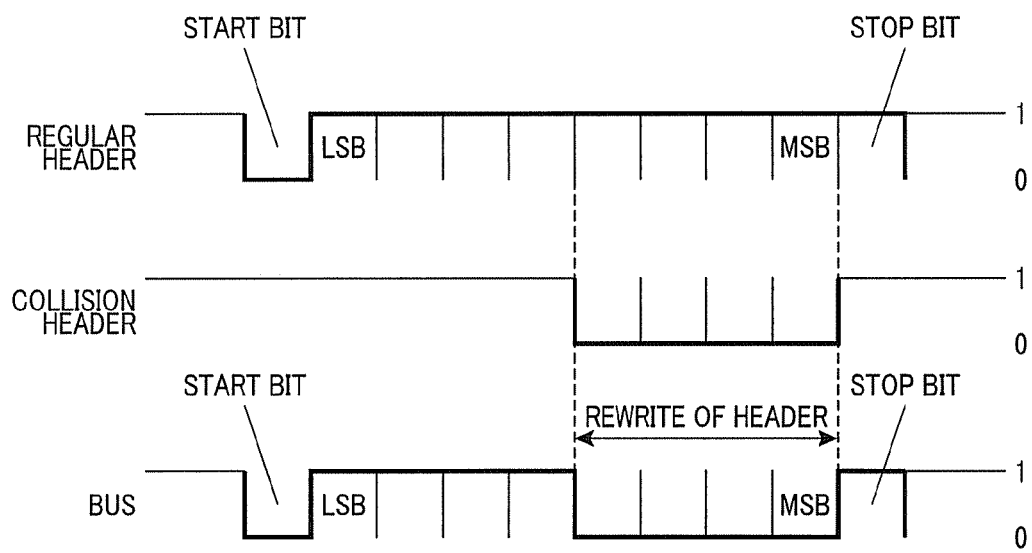
FIG. 4 is a timing chart schematically illustrating a function of a collision header according to the first embodiment.

Specifically, as illustrated in FIG. 4, when the collision header generator 18 transmits a collision header, the second four bits "1111" of the regular header He (0xFF) are rewritten into four bits "0000", so that the regular header He is rewritten into a rewritten event header Hx (0xF0).

Next, the master task to be carried out by the microcomputer 11 of the master 10a in accordance with a corresponding master-task program P1 stored in the microcomputer 11 will be described hereinafter with reference to FIG. 5.

The master task (master-task program P1) is launched when execution of an initializing process allows the bus 135 to be used after the master 10a is powered on.

When the master task is launched, the microcomputer 11 of the master 10a determines whether there is timing for sending a regular header Hc according to the previously established schedule in step S110. When determining that there is not timing for sending a regular header He (NO in step S110), the microcomputer 11 determines whether there is timing for sending an event header He according to the previously established schedule in step S150. When determining that there is not timing for sending an event header He (NO in step S150), the microcomputer 11 returns to step S110, and repeats the determinations in step S110 and S150 until the determination of any one of steps S110 and S150 is affirmative.

Specifically, in accordance with the previously established schedule, the microcomputer 11 sends any one of a regular header He and an event header He for each slot allocated for sending a corresponding one frame (header and response). For example, the schedule has been determined such that a regular header He and an event header He are alternately transmitted from the master 10a, or such that one of a regular header He and an event header He is transmitted every time the other of the regular header He and the event header He is transmitted at M times (M is an integer equal to or greater than 2).

When determining that there is timing for sending a regular header Hc (YES in step S110), the microcomputer 11 operates in the regular communication mode to transmit a regular header He via the UART 11a in step S120, and determines whether received header H by the UART 11a is matched with the transmitted header He in step S130.

When determining that the received header H is mismatched with the transmitted header He (NO in step S130), the microcomputer 11 determines that rewrite of the regular header He has been performed, proceeding to step S140. Otherwise, when determining that the received header H is matched with the transmitted header He (YES in step S130), the microcomputer 11 determines that rewrite of the regular header He has not been performed. Then, the microcomputer 11 sends a designation ID for designating a node 10 allowed to transmit a response R in step S140, returning to step S110 and repeats the master task from step S110.

On the other hand, when determining that there is timing for sending an event header He (YES in step S150), the microcomputer 11 operates in the event communication mode to transmit an event header He via the UART 11a in step S160. After transmission of the event header He in step S160 or when determining that rewrite of the regular header He has been performed by the collision header generator 18 so that the rewritten event header Hx is transmitted (NO in step S130), the microcomputer 11 starts to measure time (for example, sets a hardware or software timer to count up) in step S170, and determines whether it has received a designation ID before the measured time (counted value) reaches a predetermined first time-out value (first maximum allowed time) that will be allowed to elapse before the receiving of a designation ID is to take place in steps S170 and S180. Specifically, in step S170, the microcomputer 11 determines whether it has received a designation ID by determining whether received 8-bit data by the UART 11a via the decoder 16, which is surrounded by the start bit and the a stop bit, represents a designation ID.

When determining that the microcomputer 11 has received a designation ID before the measured time reaches the first time-out value (YES in step S180), the microcomputer 11 returns to step S110 and repeatedly performing the master task from step S110.

In contrast, when determining that the microcomputer 11 has not received a destination ID (NO in step S180) before the measured time reaches the first time-out value (NO in step S190), the microcomputer 11 returns to step S180, and waits for receiving a destination ID. Otherwise, when determining that the microcomputer 11 has not received a destination ID (NO in step S180) after the measured time has reached the first time-out value (YES in step S190), or when determining that the microcomputer 11 has received a destination ID after the measured time has reached the first time-out value (see step S185), the microcomputer 11 determines that there are no request of event communications in all the nodes 10, returning to step S110 and repeatedly performing the master task from step S110.

Figure 6:
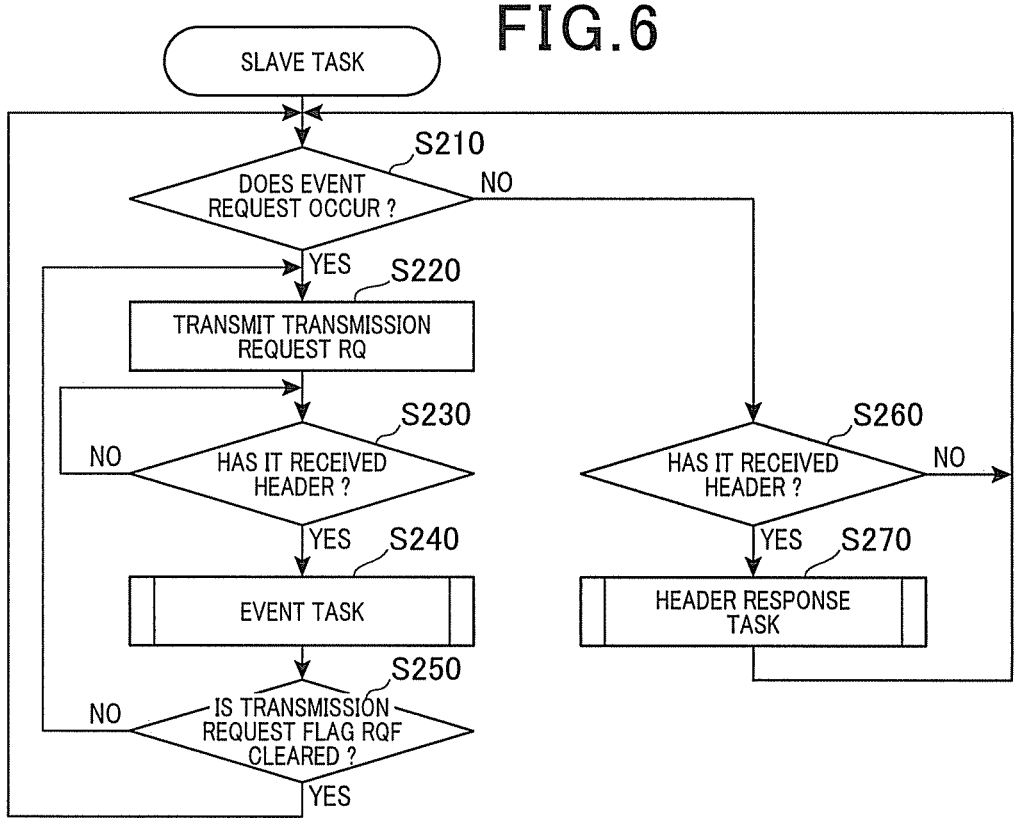
FIG. 6 is a flowchart schematically illustrating a slave task to be carried out by the microcomputer of each node of the communication system according to the first embodiment.

Next, the slave task to be carried out by the microcomputer 11 of each of the nodes 10 in accordance with a corresponding slave-task program P2 stored in the microcomputer 11 will be described hereinafter with reference to FIG. 6.

The slave task (slave-task program P2) is launched when execution of the initializing process allows the bus BS to be used after the corresponding node 10 is powered on.

When the slave task is launched, the microcomputer 11 of the corresponding node 10 determines whether there is a request of event communications in step S210 (such a request will also be referred to as an event request hereinafter. As described above, in the first embodiment, a request of event communications can be set by a task executed by the microcomputer 11 separately from the slave task.

When determining that there is a request of event communications (YES in step S210), the microcomputer 11 operates in the event communication mode to transmit, to the collision header generator 18, the transmission request RQ in step S220, and thereafter determines whether it has received a header H via the UART 11a in step S230. When determining that the microcomputer 11 has not received a header H (NO in step S230), the microcomputer 11 returns to step S230, and waits for receiving a header H. Otherwise, when determining that the microcomputer 11 has received a header H (YES in step S230), the microcomputer 11 performs an event task to implement event communications in step S240 described in detail later.

Note that, if an event header He is transmitted from the master 10a with the transmission request flag RQF being set in the collision header generator 18, because no collision headers are outputted from the collision header generator 18, the event header He is received by each node 10 as it is (see FIG. 3). Otherwise, if a regular header He is transmitted from the master 10a with the transmission request flag RQF being set in the collision header generator 18, because a collision header is outputted from the collision header generator 18, the rewritten event header Hx is received by each node 10 (see FIG. 3). At that time, the transmission request flag RQF is reset in step S50 of FIG. 3 irrespective of whether a collision header has been transmitted.

Thereafter, the microcomputer 11 determines whether the request of event communications is cleared by the event task in step S250. When determining that the request of event communications is not cleared by the event task (NO in step S250), the microcomputer 11 returns to step S220 and repeatedly performs the event task in step S220.

Otherwise, when determining that the request of event communications is cleared by the event task (YES in step S250), the microcomputer 11 returns to step S210 and repeatedly performs the slave task from step S210.

On the other hand, when determining that there is not a request of event communications (NO in step S210), the microcomputer 11 determines whether it has received a header H via the UART 11a in step S260. When determining that the microcomputer 11 has not received a header H (NO in step S260), the microcomputer 11 returns to step S210, and repeatedly performs the slave task from step S210. Otherwise, when determining that the microcomputer 11 has received a header H (YES in step S260), the microcomputer 11 performs a header response task including reply of a response R according to the received header H in step S270, returning to step S210, and repeatedly performing the slave task from step S210.

Note that, if the transmission request flag RQF being reset, the received header H is any of a regular header Hc, an event header He, and a rewritten event header Hx.

Figure 7:
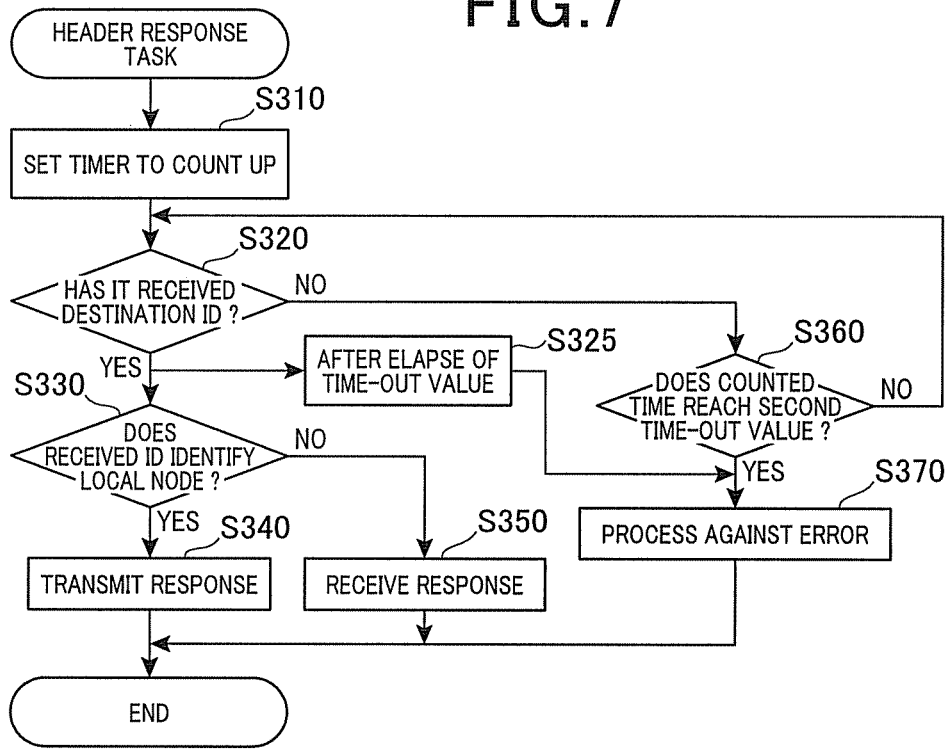
FIG. 7 is a flowchart schematically illustrating a header response task in step S270 of FIG. 6.

Next, the header response task to be executed by the microcomputer 11 in step S270 will be fully described hereinafter with reference to FIG. 7.

When the header response task is launched in response to the affirmative determination in step S260, the microcomputer 11 starts to measure time (for example, sets a hardware or software timer to count up) in step S310, and determines whether it has received a designation ID before the measured time (counted value) reaches a predetermined second time-out value (second maximum allowed time) that will be allowed to elapse before the receiving of a designation ID is to take place in steps S320 and S360. Note that the second time-out value can be identical to or different from the first time-out value. For example, in step S320, the microcomputer 11 determines whether it has received a designation ID by determining whether the UART 11a receives, through the decoder 16, 8-bit data surrounded by the start and stop bits, and the 8-bit data represents a designation ID.

When determining that the microcomputer 11 has not received a designation ID (NO in step S320) before the measured time reaches the second time-out value (NO in step S360), the microcomputer 11 returns to step S320, and waits for receiving a designation ID. Otherwise, when determining that the microcomputer 11 has not received a designation ID (NO in step S320) after the measured time has reached the second time-out value (YES in step S360), or when determining that the microcomputer 11 has received a designation ID after the measured time has reached the second time-out value (see step S325), the microcomputer 11 determines that there is any error in the master 10a and/or on the bus BS, performing a prepared process against the error in step S370, terminating the header response task and returning to step S210.

Otherwise, when determining that the microcomputer 11 has received a designation ID before the measured time reaches the second time-out value (YES in step S320), the microcomputer 11 determines whether the received designation ID identifies the ID of the local node (the corresponding node 10) in step S330.

When determining that the received designation ID identifies the ID of the local node (YES in step S330), the microcomputer 11 obtains data that meets the designation ID, and performs a response transmitting task to transmit the obtained data as a response R in step S340, terminating the header response task and returning to step S210. Note that the response transmitting task in step S340 is configured to cause the UART 11a to repeat transmission of a number of pieces of block data; the number of pieces of block data corresponds to the length of data to be transmitted as a response R.

Otherwise, when determining that the received designation ID does not identify the ID of the local node (NO in step S330), the microcomputer 11 performs a response receiving task to receive a response R transmitted from another node in step S350, terminating the header response task and returning to step S210. Note that the response receiving task is configured to repeat receipt of a number of pieces of block data; the number of pieces of block data corresponds to the length of data designated by the response R.

More specifically, in step S350, each time the microcomputer 11 receives a piece of block data, the microcomputer 11 starts to measure time (for example, sets a hardware or software timer to count up), and determines whether it has received a piece of block data before the measured time (counted value) reaches a predetermined third time-out value (third maximum allowed time) that will be allowed to elapse before the receiving of a piece of block data is to take place.

When determining that the microcomputer 11 has not received a piece of block data before the measured time reaches the third time-out value, the microcomputer 11 waits for receiving a piece of block data. Otherwise, when determining that the microcomputer 11 has not received a piece of block data after the measured time has reached the third time-out value, or when determining that the microcomputer 11 has received a piece of block data after the measured time has reached the third time-out value, the microcomputer 11 determines that there is any error in the master 10a and/or on the bus BS, and performs a prepared process against the error while deleting data that having been received so far, terminating the header response task and returning to step S210.

Figure 8:
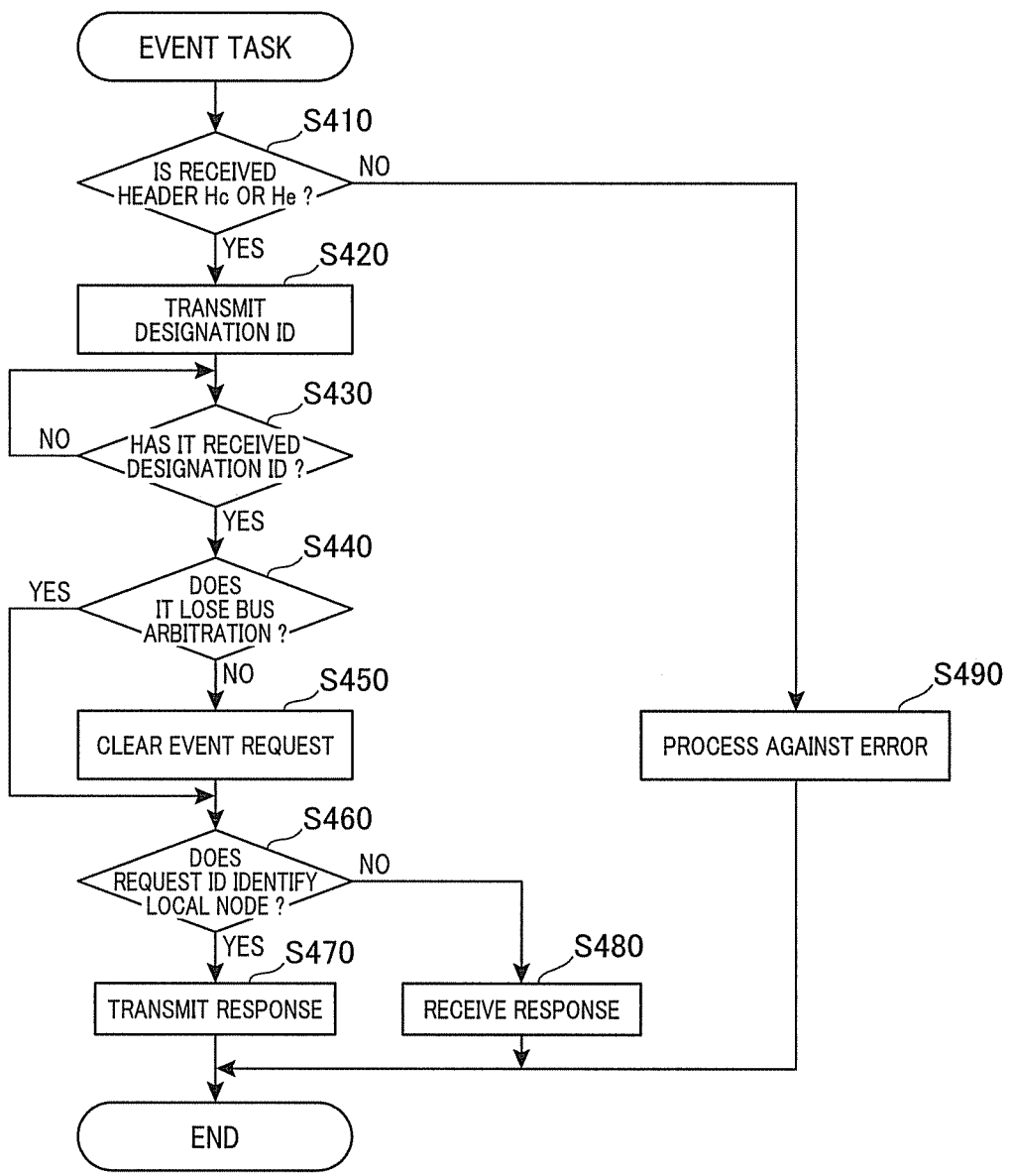
FIG. 8 is a flowchart schematically illustrating an event task in step S240 of FIG. 6.

Next, the event task to be executed by the microcomputer 11 in step S240 will be fully described hereinafter with reference to FIG. 8.

When the event task is launched in response to the affirmative determination in step S230, the microcomputer 11 determined whether the received header H is an event header He or a rewritten event header Hx in step S410. When determining that the received header H is not an event header He or a rewritten event header Hx (NO in step S410), the microcomputer 11 performs a prepared process against the error in step S490, terminating the event task and proceeding to step S250.

Otherwise, when determining that the received header H is any of an event header He or a rewritten event header Hx (YES in step S410), the microcomputer 11 transmits a designation ID meeting the request of event communications via the UART 11a in step S420, and waits until the UART 11a has received a designation ID via the bus BS (NO in step S430).

When the UART 11a has received a designation ID, the microcomputer 11 compares the received designation ID with the transmitted designation ID, thus determining whether the transmitted designation ID loses bus arbitration based on a result of the comparison in step S440.

When determining that the received designation ID is matched with the transmitted designation ID so that the transmitted designation ID wins bus arbitration (NO in step S440), the microcomputer 11 determines that its requested event communications are accepted, clearing the request of event communications in step S450.

Following step S450, the microcomputer 11 determines whether the received destination ID identifies the ID of the local node (the corresponding node 10) in step S460. When determining that the received designation ID identifies the ID of the local node (YES in step S460), the microcomputer 11 obtains data that meets the designation ID, and performs a response transmitting task to transmit the obtained data as a response R in step S470 as well as step S340, terminating the event task and returning to step S210.

Otherwise, when determining that the received designation ID does not identify the ID of the local node (NO in step S460), the microcomputer 11 performs a response receiving task to receive a response R transmitted from another node in step 480 as well as step S350, terminating the event task and returning to step S210.

Figure 9:
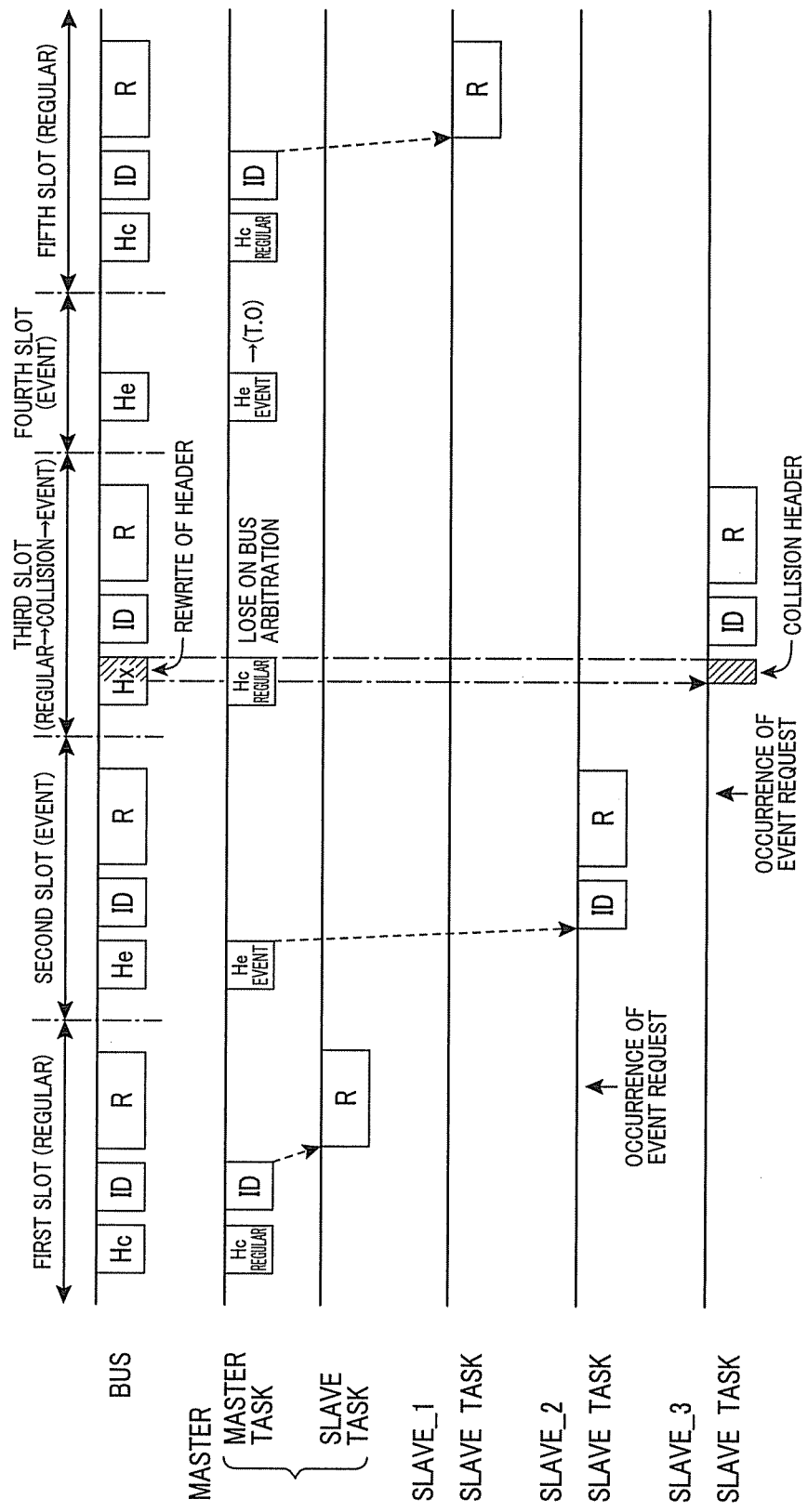
FIG. 9 is a timing chart schematically illustrating basic operations of the communication system according to the first embodiment.

FIG. 9 is a timing chart schematically illustrating basic operations of the communication system 1 according to this embodiment.

Referring to FIG. 9, the master task of the master 10a transmits any one of a regular header He (REGULAR H) and an event header He (EVENT H) for each slot previously determined in accordance with the predetermined schedule (see steps S110, S120, S150, and S160). For example, FIG. 9 shows that a regular frame Hc and an event frame He are alternatively transmitted from the master 10a. When transmitting a regular header Hc, the master task of the master 10a transmits a destination ID of target nodes following the regular header Hc; each of the target nodes is requested by the master 10a to reply a response R. The value of the destination ID is set to successively select pieces of data required to be shared by all nodes 10 in accordance with the previously established schedule.

When the destination ID following the regular header He identifies the local node (the corresponding node), the slave task of each node 10 transmits a prepared response "R" subsequent to the received destination ID (see step S320 to S340). For example, in FIG. 9, because the master 10a is identified by the destination ID of the regular frame Hc in the first slot, the slave task of the master 10a sends a prepared response R subsequent to the received destination ID. Similarly, because a slave _1 is identified by the destination ID of a regular frame Hc in the fifth slot, the slave task of the slave _1 sends a prepared response R subsequent to the received destination ID. As described above, a response R is received by all the nodes 10, and used by at least one node 10 when its needs it.

If an event header He is transmitted by the master task, the slave task of a node 10 in which a request of event communications occurs (see a slave _2 in FIG. 9) successively sends the received event header He and destination ID meeting the request of event communications (see steps S410 and S420).

The slave task of each node 10 receives the event header He and the destination ID, and successively sends the received event header Hc, the received destination ID, and a prepared response R when the destination ID identifies the corresponding node 10 (see steps S460 and S470).

For example, in the second slot of FIG. 9, the slave _2 successively sends the received event header Hc, the received destination ID, and a prepared response R. That is, the second slot of FIG. 9 demonstrates that the destination ID transmitted from a node 10 (slave _2) identifies the corresponding local node 10 (slave _2). Note that, in the event communication mode, each node 10 can transmit a destination ID that identifies the corresponding local node 10 or another node 10.

When a node 10 (a slave _3 in the third slot of FIG. 9) receives a regular header He with a request of event communications being generated, the slave task of the node 10 (slave _3) transmits a collision header to rewrite the regular header He into a rewritten event header He (see step S220 and steps S10 to S50). At that time, in response to detecting the rewrite of the regular header Hc, the arbitrator 17 of the master 10a stops transmission of the header H immediately. Thereafter, each node 10 performs the same operations as the operations when normally receiving an event header He (see steps S330 and S340, and the third slot of FIG. 9).

If there are no requests of event communications in each of nodes 10 with an event header He being transmitted from the master task of the master 10a, the master task waits for the receipt of a destination ID for the first maximum allowed time, and thereafter, transmits a next header H (see steps S170 to S190, and the fourth slot of FIG. 9).

Figure 10:
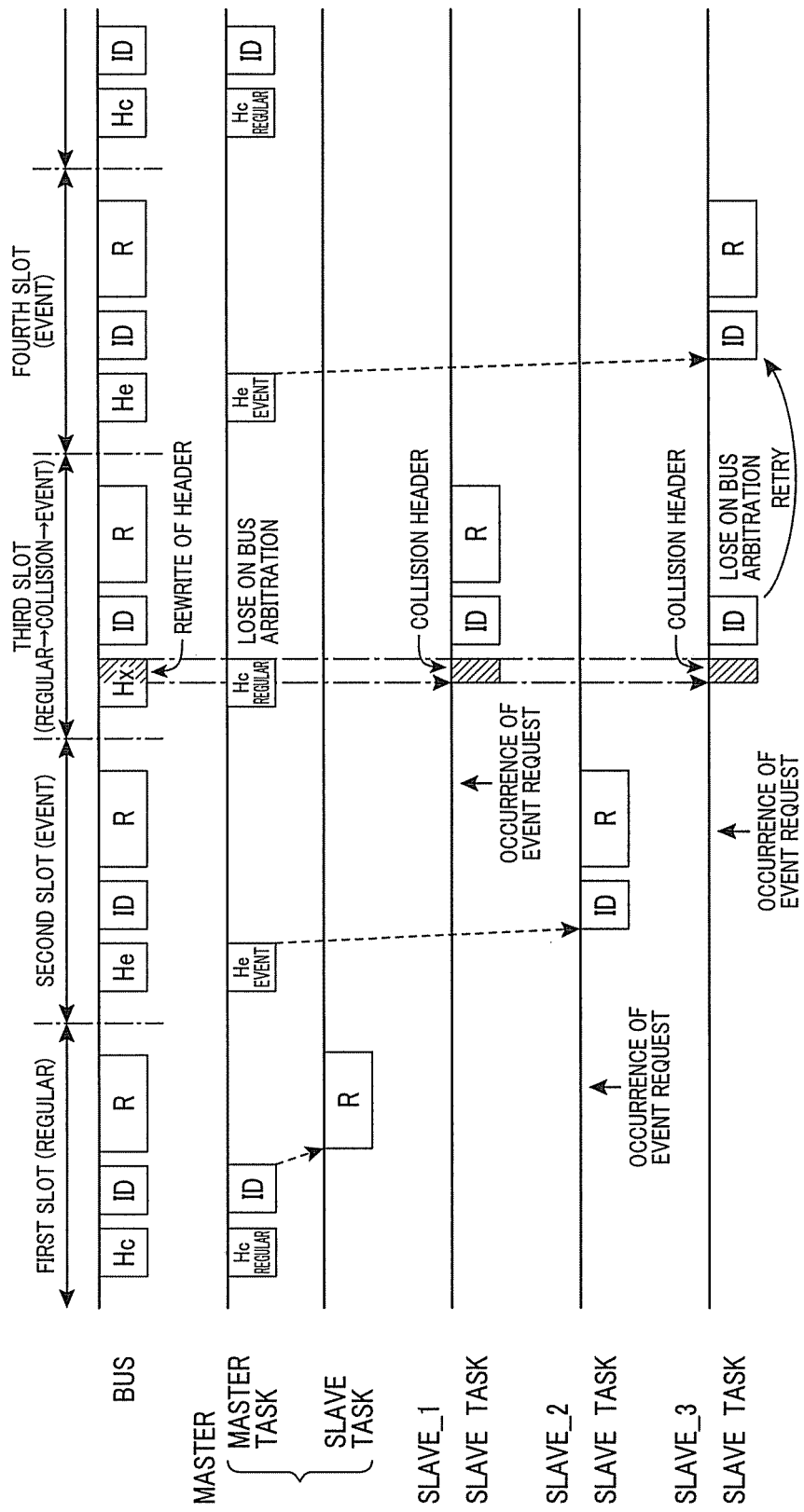
FIG. 10 is a timing chart schematically illustrating operations of the communication system according to this embodiment if requests of event communications simultaneously occur in some nodes.

FIG. 10 is a timing chart schematically illustrating operations of the communication system 1 according to this embodiment if requests of event communications simultaneously occur in some nodes 10.

As illustrated in the third slot in FIG. 10, when a regular header He is transmitted by the master task of the master 10a with requests of event communications occurring in nodes 10 (slaves _1 and _3 in the third slot of FIG. 10), each of the request nodes (slaves _1 and _3) in which a corresponding request of event communications occurs transmits a collision header to rewrite the regular header He into the rewritten event header He (see step S220 and steps S10 to S50), and thereafter transmits a designation ID based on the corresponding request of event communications (see step S420). This results in that a collision occurs between the designation ID transmitted from the slave _1 and the destination ID transmitted from the slave _3.

For example, the destination ID t transmitted from the slave _1 can be represented as 8-bit binary data of LSB00000110, and the destination ID transmitted from the slave _3 can be represented as 8-bit binary data of LSB00001110. When there is a collision between the designation ID transmitted from the slave _1 and the destination ID transmitted from the slave _3, because the first to fourth bits are all 0 (dominants), the same first codes corresponding to the dominants are simultaneously transmitted on the bus BS from the slave _1 and _3.

Because the destination ID (00001110) transmitted from the slave _3 is greater than the destination ID (00000110) transmitted from the slave _1, the recessive (1) appears in the destination ID transmitted from the slave _3 earlier than in the destination ID transmitted from the slave _1. That is, when there is a collision between the designation ID transmitted from the slave _1 and the destination ID transmitted from the slave _3, because the fifth bit of the destination ID (00001110) transmitted from the slave _3 is 1 (recessive) whereas the fifth bit of the destination ID (00000110) transmitted from the slave _1 is 0 (dominant), the second code corresponding to the recessive and the first code corresponding to the dominant are simultaneously transmitted on the bus BS so that arbitration between the first code and the second code occurs on the bus BS (see (c) of FIG. 2).

As described above, because the dominant wins arbitration on the bus BS upon collision between the dominant and the recessive, the second and third recessives of the second code lose arbitration on the bus BS (see NO in step S440) so that they are changed to the dominants (see (c) of FIG. 2). This results in that the second code transmitted from the slave _3 is changed to the first code on the bus BS. In other words, as a result of arbitration of the bus BS between the designation ID transmitted from the slave _1 and the destination ID transmitted from the slave _3, the destination ID transmitted from the slave _1 wins. Thus, event communications are performed in accordance with the destination ID transmitted from the slave _1 (see step S470 and the third slot of FIG. 10).

At that time, the arbiter 17 of the request node (slave _3) as the sender of the loser destination ID detects the mismatching between the second code of the fifth bit of the transmitted ID and the first code on the bus BS monitored through the receive buffer 15, thus disabling the encoder 13 to output transmit data TxD. This stops the transmission of the destination ID from the slave _3. Thus, a prepared response R meeting the destination ID transmitted from the slave _1 is only transmitted on the bus BS.

Because the request of event communications is not cleared in the request node (slave _3) as the sender of the loser destination ID (see the skip of step S450), the request node (slave _3) retries event communications in the next slot. Specifically, in FIG. 10, because the master 10a transmits an event header He in the next fourth slot, the request node (slave 3) as the sender of the loser destination ID in the previous slot (third slot) receives the event header He, and successively transmits the event header He and the destination ID (see step S420 and the fourth slot of FIG. 10).

As described above, the communication system 1 according to the first embodiment is configured such that each node 10 determines whether there is timing for starting the regular communication mode or timing for starting the event communication mode based on a header H sent from the master 10a. This configuration eliminates the need of communications among nodes 10 using specific frames for switching between the regular communication mode and the event communication mode. Thus, if there is a request of event communications in a node 10, the node 10 can immediately inform in another node 10 of the occurrence of the request of event communications without waiting for the order of the corresponding node 10 in the regular communication mode according to the previously established schedule.

The communication system 1 according to the first embodiment is also configured to transmit a collision header if a request of event communications occurs at timing of regular communications to rewrite a regular header He into a rewritten event header Hx, thus executing event communications. This configuration allows event communications to be executed higher in priority than regular communications.

In addition, the communication system 1 according to the first embodiment is configured to, if there are requests of event communications in some nodes (request nodes) 3 so that the request nodes 3 simultaneously transmit their destination IDs at timing of event communications, arbitrate the destination IDs on the bus BS, and enable event communications to be executed based on one of the destination IDs, which wins the arbitration on the bus BS. That is, the communication system 1 according to the first embodiment is configured to continuously perform event communications in a slot in which there is a collision between destination IDs, making it possible to efficiently perform event communications.

Note that, in this embodiment, the latter four bits of a regular header He is configured to be rewritten by a collision header, but a number of bits, which are equal to or greater than one bit and equal to or smaller than seven bits, of a regular header He can be configured to be rewritten by a collision header.

In this embodiment, the communication system 1 is configured to transmit, in either the regular communication mode or the event communication mode, a header H and a destination ID subsequent to the header H, but the present disclosure is not limited thereto. Specifically, a regular header He can be designed to serve a destination ID, and transmission of a destination ID by the master 10a in the regular communication mode can be eliminated.

A communication system according to this modification is configured such that an event header He is expressed as "00x00" in hex, values (10x10, 20x20, . . . , 0xE0, and 0xF0), the latter four bits of which are set to "0000", are allowed to be used as a rewritten event header Hx, these values of an event header He and a rewritten event header Hx are used as destination IDs, and a header H to which any of the allowed values (10x10, 20x20, . . . , 0xE0, and 0xF0) is set is manipulated as a regular header Hc.

Figure 11:
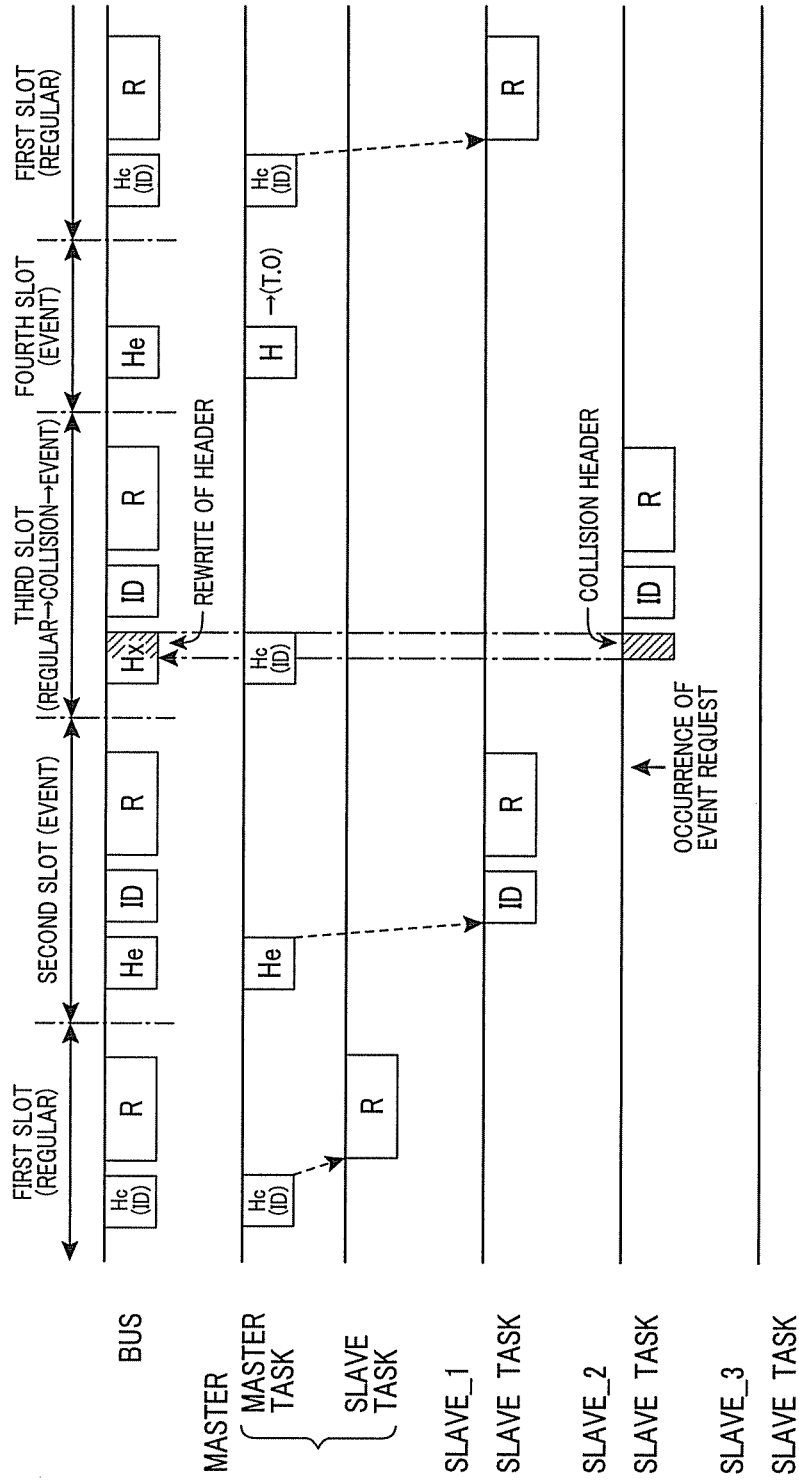
FIG. 11 is a timing chart schematically illustrating basic operations of the communication system according to a modification of the first embodiment.

FIG. 11 is a timing chart schematically illustrating basic operations of the communication system according to this modification of the first embodiment.

Referring to FIG. 11, the master task of the master 10a transmits a regular header He including a corresponding destination ID, which is a point different from the basic operations of the communication system according to the first embodiment. Thus, the communication system according to this modification improves communication efficiency on the bus BS by omission of transmission of destination IDs in the regular communication modes.

Second Embodiment

A communication system according to a second embodiment of the present disclosure will be described with reference to FIG. 12.

Figure 12:
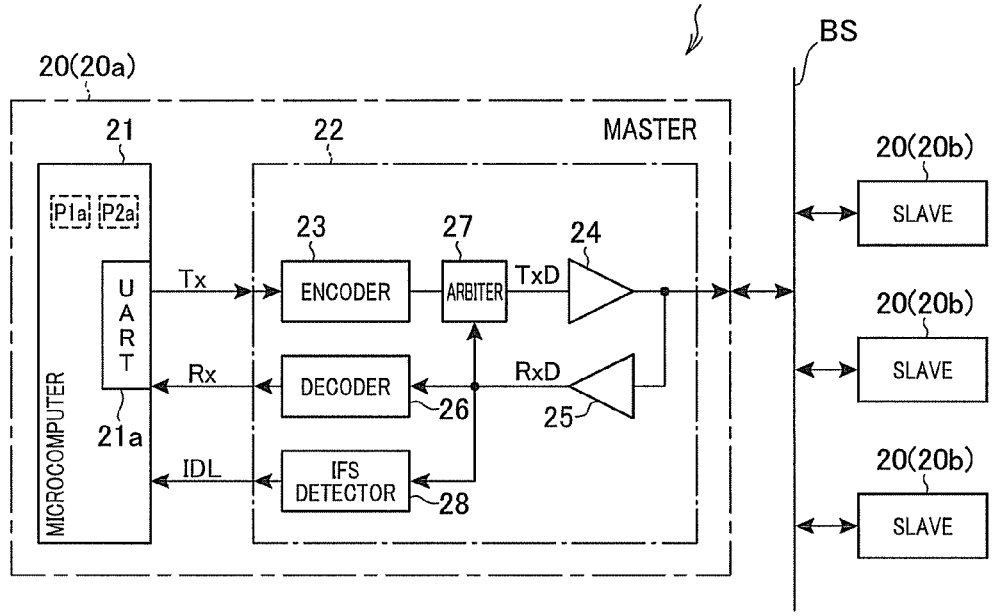
FIG. 12 is a circuit diagram schematically illustrating an example of the overall structure of a communication system according to a second embodiment of the present disclosure.

Referring to FIG. 12, a communication system 2 according to the second embodiment includes a plurality of nodes 20, one of which is a master (master node) 20a and the remaining nodes are slaves (slave nodes) 20b. Each of the nodes 20 is comprised of a microcomputer 21 and a transceiver 22 as well as a node 10 according to the first embodiment.

The transceiver 22 is comprised of an encoder 23, a transmit buffer 24, a receive buffer 25, a decoder 26, and an arbiter 27, which are identical to the encoder 13, the transmit buffer 14, the receive buffer 15, the decoder 16, and the arbiter 17 of the transceiver 12, respectively. Thus, the structures and functions of the components 23 to 27 of the transceiver 22 are omitted in description.

Particularly, the transceiver 22 of each node 10 is comprised of an IFS detector 28 in place of the collision header generator 18.

Specifically, a period within which a predetermined same level corresponding to a predetermined number of same bits in received data RxD are continued on the bus BS will be referred to as IFS (Inter Frame State), and if the IFS is detected as the current state of the bus BS, the bus BS is in idle state.

The IFS detector 28 is configured to monitor the current state of the bus BS based on received data RxD, and to supply, to the microcomputer 21, an idle detection signal IDL in response to detecting that the bus BS is in the idle state.

Figure 5:
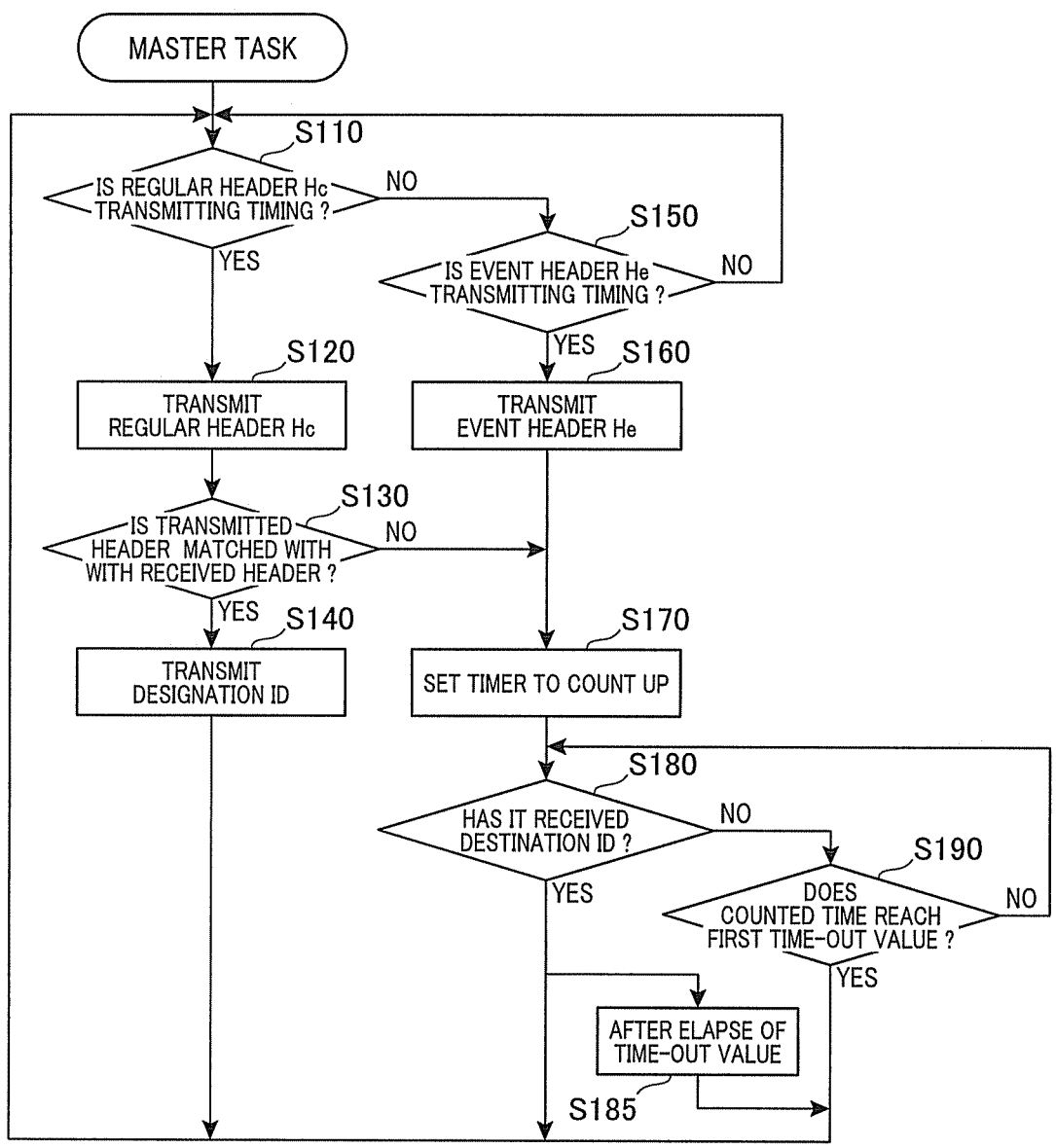
FIG. 5 is a flowchart schematically illustrating a master task to be carried out by the microcomputer of a master of the communication system according to the first embodiment.

The master task based on a master-task program P1*a* to be executed by the microcomputer 21 of the master 20*a* according to the second embodiment is configured to perform the operations in steps S110 to S190 of FIG. 5 while skipping the operations in steps S150 and S160.

Specifically, the master task transmits a regular header operates in the regular communication mode to transmit a regular header He every predetermined timing in step S120. When determining that a received header H via the bus BS is matched with the transmitted header He (YES in step S130), the master task continues the regular communications in step S140. Otherwise, when determining that the received header H is mismatched with the transmitted header He (NO in step S130), the microcomputer 21 determines that the regular header He has been rewritten into the rewritten event header He, thus allowing execution of event communications.

Note that transmission of a header H in step S120 is executed immediately each time transmission timing occurs without the IFS undetected, and is executed when the IFS is detected after every transmission timing.

Figure 13:
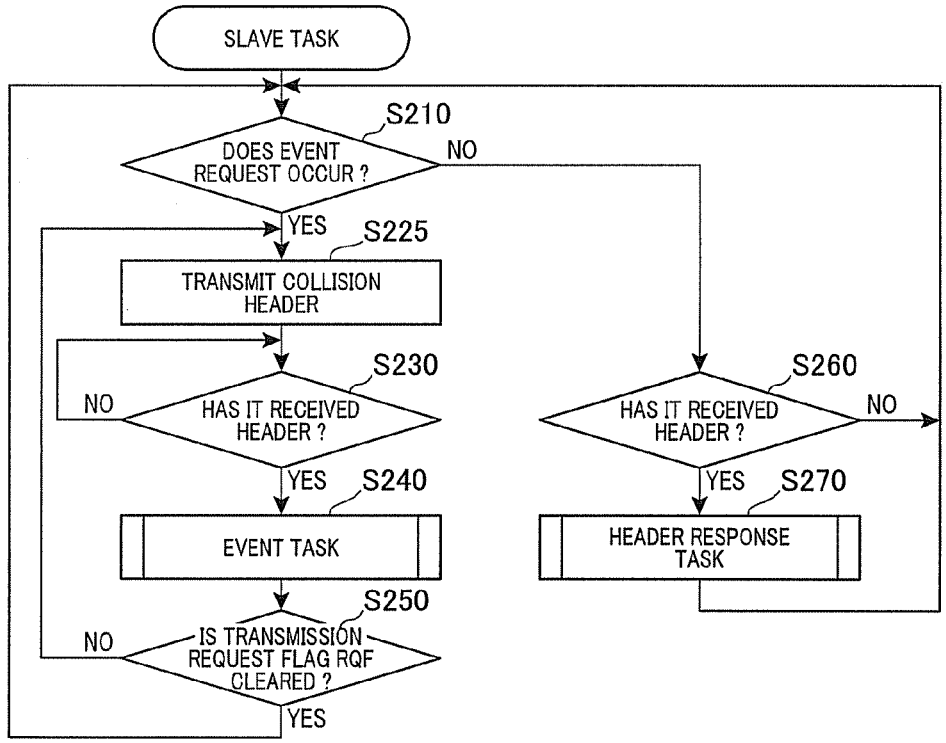
FIG. 13 is a flowchart schematically illustrating a slave task to be carried out by the microcomputer of each node of the communication system according to the second embodiment.

The slave task according to the second embodiment will be described hereinafter with reference to FIG. 13.

Next, the slave task to be carried out by the microcomputer 21 of each of the nodes 20 in accordance with a corresponding slave-task program P2*a* stored in the microcomputer 21 will be described hereinafter with reference to FIG. 13. The operations of the slave task to be executed by the microcomputer 21 are substantially identical to those of the slave task to be executed by the microcomputer 21 except for the following point.

Specifically, when determining that there is a request of event communications (YES in step S210), the microcomputer 21 transmits a collision header in place of transmitting, to the collision header generator 18, the transmission request RQ in step S225. Note that transmission of a collision header in step S225 is executed immediately after the occurrence of a request of event communications with the IFS detected, and is executed after detection of the IFS if the IFS is not detected.

A collision header according to this embodiment is configured to be transmitted via the UART 21*a* as well as headers H and designation IDs; this collision header according to this embodiment is different from a collision header, configured to be transmitted from the collision header generator 18, according to the first embodiment.

Figure 14:
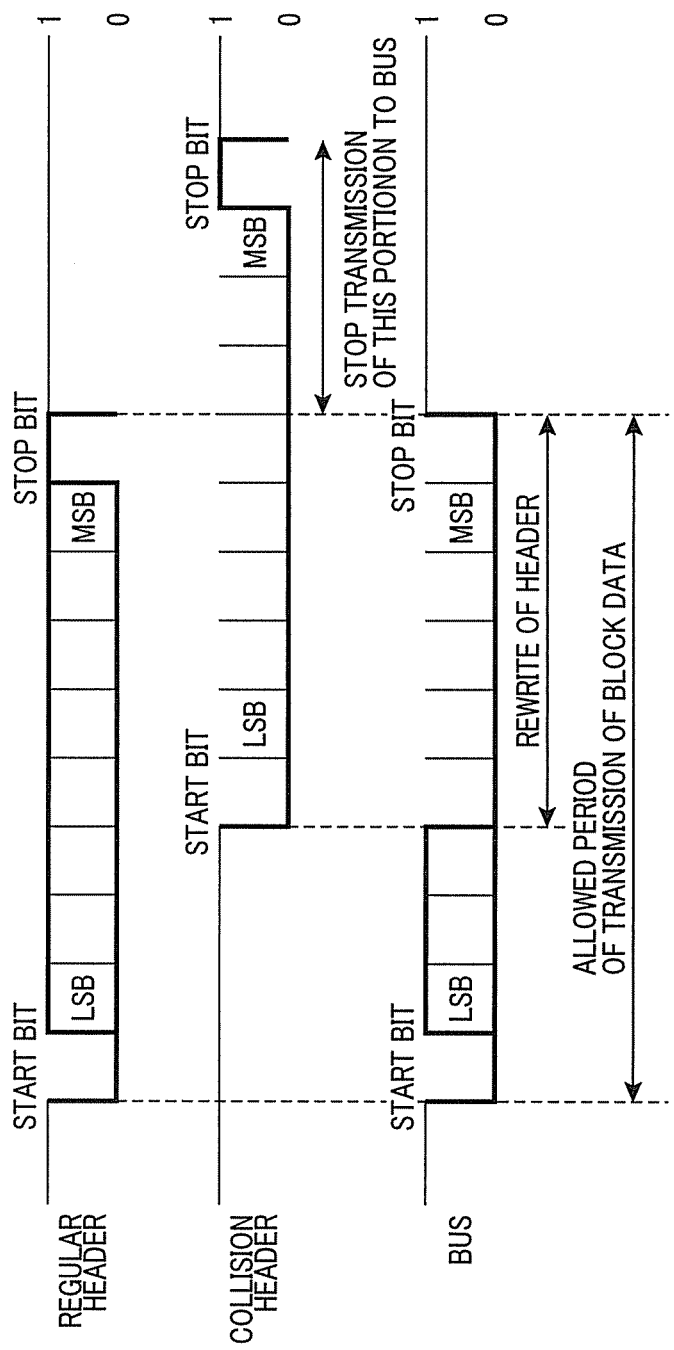
FIG. 14 is a timing chart schematically illustrating a function of a collision header according to the first embodiment.
Figure 15:
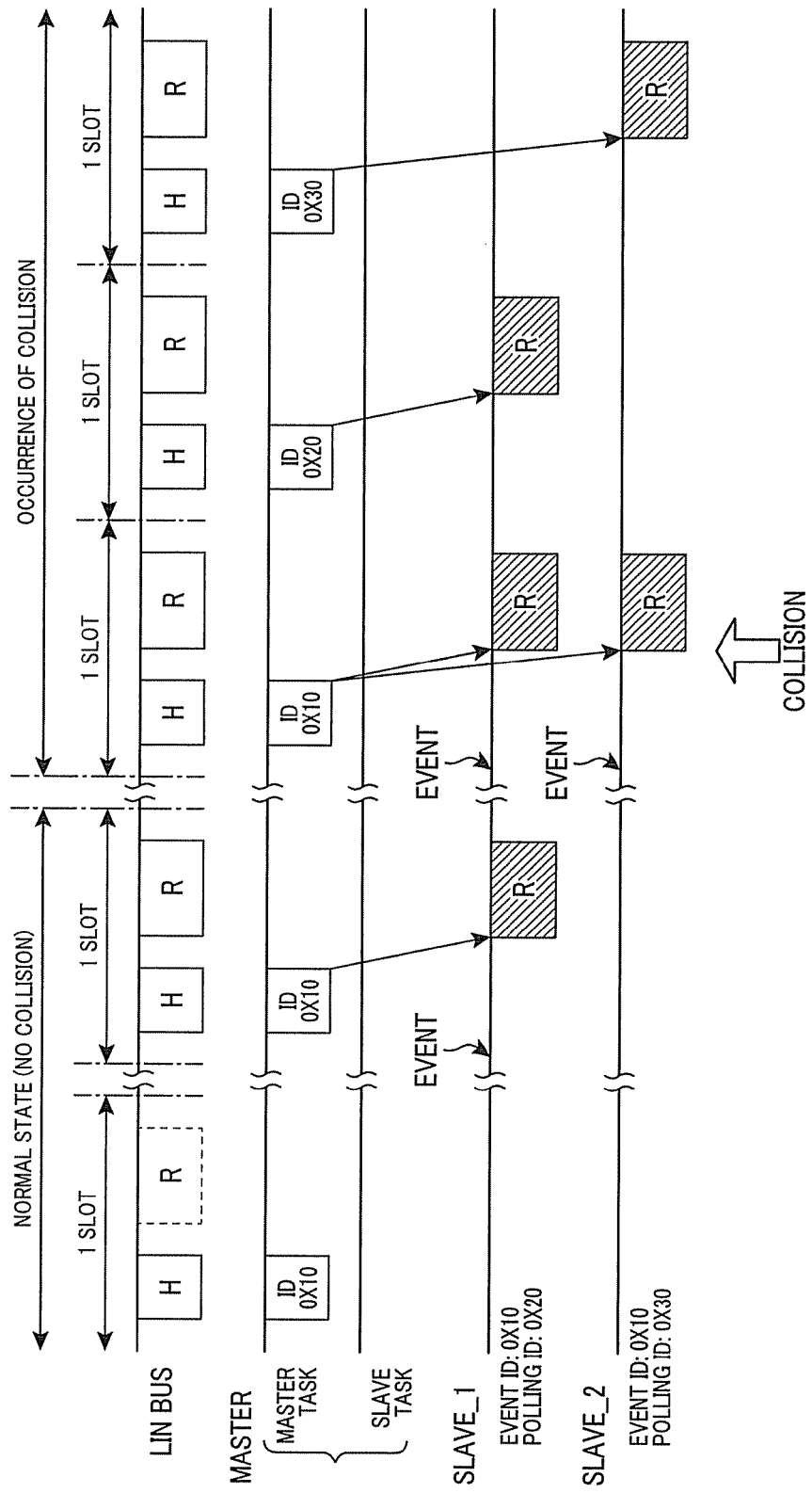
FIG. 15 is a timing chart schematically illustrating basic operations of a conventional communication system.

Specifically, as illustrated in FIG. 14, a collision header consists of block data including a start bit, a stop bit, and one byte (8-bit) data of "0x00 (00000000)" surrounded by the start and stop bits.

Such a collision header is configured to be transmitted at given timing during periods within which no designation IDs and responses R are transmitted or received on the bus BS. For this reason, when a regular header He collides with a collision header, one or more bits of the regular header He with which the corresponding one or more bits of the collision header including the stop bit collide are rewritten into the dominant bit(s) "0". Thus, any of all bit patterns "10000000", "11000000", "11110000", "11110000", "11111000", "11111100", and "11111110", which can be generated by rewrite of the regular header He becomes a rewritten event header Hx. In addition, when a regular header He does not collide with a collision header, a collision header "00000000" itself becomes a rewritten event header Hx.

Note that, when a period required to transmit data of 10 bits has elapsed since the start bit, the arbitrator 27 is configured to stop the supply of transmit data TxD to the transmit buffer 24. For this reason, one or more bits of the collision header, which exceed the tenth bit from the start bit thereof, are not transmitted to the bus BS. In other words, one or more bits of the collision header, which exceeds an allowed period required to transmit 10 bits from the start bit of the collision header, are not transmitted to the bus BS.

In addition, note that, because the stop bit of a regular header He (and therefore a rewritten event header He) is rewritten into the dominant bit "0", a node 20 is configured not to determine an error even if it cannot detect the stop bit in receiving a header.

As described above, the communication system 2 according to the second embodiment is configured to perform event communications only when transmitting a collision header if need arises. This configuration eliminates the need to regularly transmit event headers He from the master 20*a*, making it possible to more improve communication efficiency on the bus BS.

The first and second embodiments of the present disclosure have been fully described, but the present disclosure is not limited to the first and second embodiments, and can be modified or deformed within the scope thereof.

For example, in each of the first and second embodiments, the communication system is applied as a communication system for vehicles, but can be applied as a communication system that needs to implement both the passive and active communication modes. In each of the first and second embodiments, using the encoder 13 (23) and decoder 16 (26) allows PWM-code data to be transmitted on the bus BS, but eliminating the encoder 13 (23) and decoder 16 (26) from each node allows NRZ-code data to be transmitted on the bus BS.

Note that, in each of the first and second embodiments, a header for example corresponds to information indicative of start of an active communication mode, an ID of a regular frame for example corresponds to designation of one of a plurality of slave nodes, and an ID of an event frame for example corresponds to infatuation requesting active transmission of data required to be transmitted in the active communication mode upon a corresponding slave node having the data.

For example, regular headers He can be used as first or second identification information, event headers He can be used as third identification information, and designation IDs can be used as first or second designations (first designation information or second designation information). The operation in step S270 can serve as a transmitting unit, and the collision header generator 18 and the operations in steps S220 to S240 (steps S410 and S420) or the IFS detector 28 and the operations in steps S225 to S240 (steps S410 and S420) can serve as an active communication request unit.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A communication system comprising: a bus and a plurality of nodes including a master node and a plurality of slave nodes, the plurality of nodes being communicably coupled to each other through the bus;
the master node is configured to transmit, in a passive communication mode, at least one of: first identification information and second identification information on the bus, the first identification information representing start timing of the passive communication mode, the second identification information including at least first designation of one of the plurality of nodes allowed to transmit data;
the master node is configured to transmit, in an active communication mode, third identification information indicative of start timing of the active communication mode on the bus;
when a request of an active communication occurs in at least one of the plurality of nodes, the at least one of the plurality of nodes serves as a request node in the active communication mode to receive, from the bus, the third identification information and successively transmit, on the bus, the third identification information and a second designation of at least one of the plurality of nodes allowed to transmit data;
each of the plurality of nodes is configured to, when receiving any one of the first designation and the second designation as designation information that designates the corresponding node, transmit; on the bus, the designation information, and, subsequent to the designation information, data;
the first identification information and the third identification information are designed to be identifiable from each other based on a former part of the first identification information and a former part of the third identification information;
the request node is configured to, when determining to receive the former part of the first identification information, transmit, on the bus, collision information at a timing that allows the collision information to collide with a latter part of the first identification information, resulting in rewrite of the first identification information based on arbitration on the bus between the collision information and the latter part of the first identification information; and
the request node is configured to regard the rewritten first identification information as the third identification information, and to operate in the active communication mode.

2. The communication system according to claim 1, wherein the master node is configured to transmit, in the passive communication mode, the second identification information including a set of the start timing of the passive communication and the first designation of the one of the plurality of nodes.

3. A communication system comprising: a bus and a plurality of nodes including a master node and a plurality of slave nodes, the plurality of nodes being communicably coupled to each other through the bus;
the master node is configured to transmit, in a passive communication mode, first identification information indicative of start timing of the passive communication mode, and transmit, subsequent to the first identification information, designation of one of the plurality of nodes allowed to transmit data;
each of the plurality of nodes is configured to, when receiving the designation that designates the corresponding node, transmit, on the bus, the designation, and, subsequent to the designation, data;
when a request of an active communication occurs in at least one of the plurality of nodes, the at least one of the plurality of nodes serves as a request node in an active communication mode to transmit, on the bus, collision information during a period within which no data and designation information are communicated on the bus, the collision information being configured to rewrite the first identification information when colliding with the first identification information; and
any one of the rewritten identification information and the collision information is configured to be transmitted on the bus as second identification information indicative of start timing of the active communication mode.

4. A node communicably coupled to a plurality of alternative nodes through a bus, the node comprising:
a transmitting unit configured to receive first designation information from one of the plurality of alternative nodes and, when the first designation information designates the node, transmit, on the bus, the first designation information and, subsequent to the first designation information, data; and
when a request of an active communication occurs in the node, an active communication request unit configured to:
determine whether to receive a former part of the first identification information indicative of start timing of an active communication mode on the bus;
when determining to receive the thinner part of the first identification information, transmit, on the bus, collision information at a timing that allows the collision information to collide with a latter part of the first identification information, resulting in rewrite of the first identification information based on arbitration on the bus between the collision information and the latter part of the first identification information; and
transmit, subsequent to the rewritten first identification information, second designation information meeting the request of the active communication.

5. A node communicably coupled to a plurality of alternative nodes through a bus, the node comprising:
a transmitting unit configured to receive first designation information from one of the plurality of alternative nodes and, when the first designation information designates the node, transmit, on the bus, the first designation information and, subsequent to the first designation information, data; and
when a request of an active communication occurs in the node, an active communication request unit configured to:
transmit, on the bus, collision information during a period within which no data and designation information are communicated on the bus, the collision information being configured to rewrite the first identification information when colliding with the first identification information, any one of the rewritten identification information and the collision information being configured to be transmitted on the bus as second identification information indicative of start timing of an active communication mode; and transmit, subsequent to the second identification information, second designation information meeting the request of the active communication.

\* \* \* \* \*